(No Model.) 2 Sheets—Sheet 1.
E. A. FIRESTONE.
ANIMAL DIPPER.
No. 486,372. Patented Nov. 15, 1892.
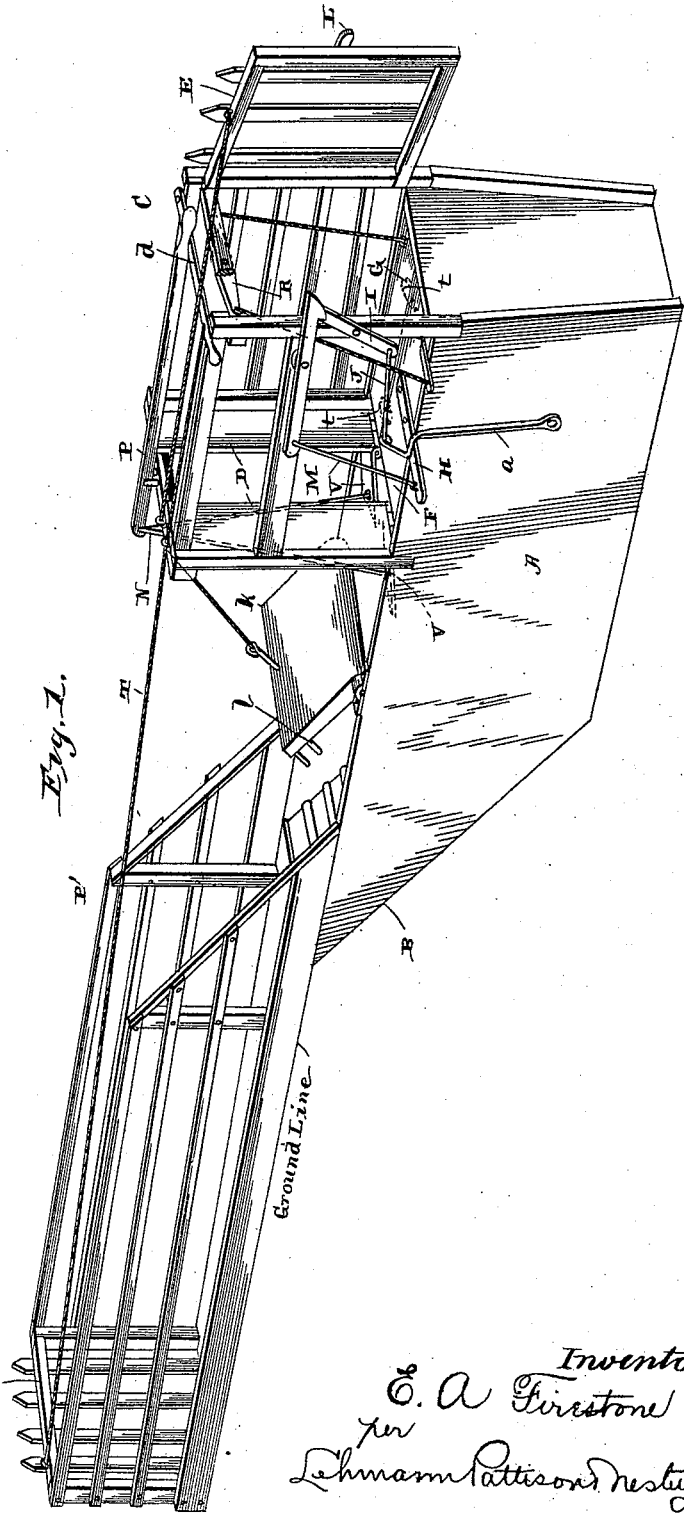
Witnesses.
Geo. E. Frech.
Rol. A. Fitzgerald.
Inventor.
E. A. Firestone
per
Lehmann, Pattison & Nesbit,
att'ys

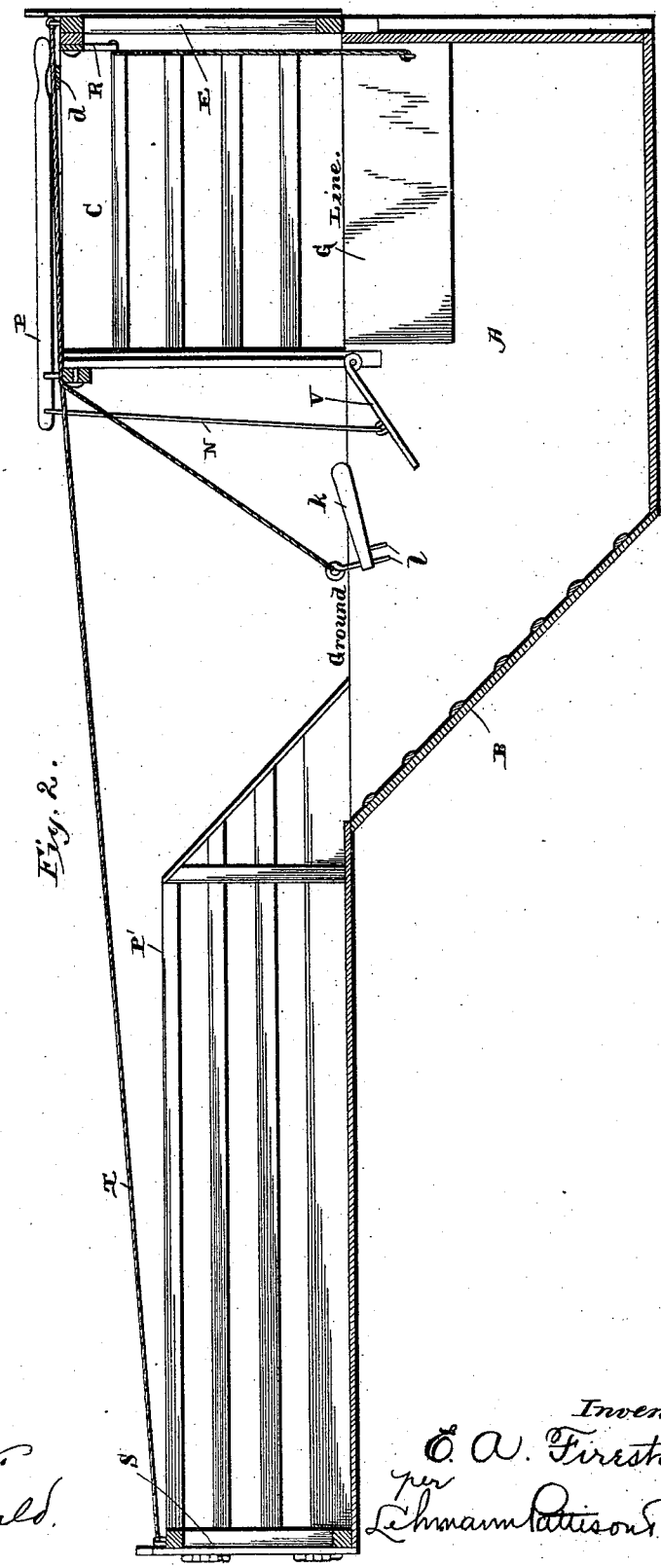

UNITED STATES PATENT OFFICE.

ELMER A. FIRESTONE, OF SPENCER, OHIO.

ANIMAL-DIPPER.

SPECIFICATION forming part of Letters Patent No. 486,372, dated November 15, 1892.

Application filed June 17, 1892. Serial No. 437,072. (No model.)

*To all whom it may concern:*

Be it known that I, ELMER A. FIRESTONE, of Spencer, in the county of Medina and State of Ohio, have invented certain new and useful Improvements in Animal-Dippers; and I do hereby declare the following to be a full, clear, and exact description of the invention, such as will enable others skilled in the art to which it pertains to make and use it, reference being had to the accompanying drawings, which form part of this specification.

My invention relates to improvements in animal dippers and which is intended to subject animals to a bath of suitable solution; and it consists in the construction and arrangement of parts which will be fully described hereinafter, and particularly referred to in the claims.

The object of my invention is to provide an apparatus for the purpose of subjecting animals to a bath of a suitable solution to kill infecting parasites, and is especially adapted for this use in connection with sheep, and the apparatus is so constructed that the animal is placed within a cage or trap and automatically dropped into a tank below and there subjected to a bath, after which he is allowed to pass out of the tank to a draining or drying rack and then allowed to pass out as another sheep is being dipped.

In the accompanying drawings, Figure 1 is a perspective view of an apparatus which embodies my invention complete. Fig. 2 is a vertical longitudinal section of the same.

A indicates a tank of a suitable size and which decreases in width slightly toward its bottom and has one end thereof inclined upward, as shown at B. Supported upon the opposite end from the said inclines is a rack or cage C, which is closed substantially at its inner ends by means of the adjustable boards D and provided at its outer end with a spring opening door E. The bottom of this cage is composed of two trap-doors F and G, which are hinged at their outer edges to the upper edge of the tank. The hinges are preferably the ordinary spring-hinges, and which will be sufficiently strong to hold them in this position. Extending outward from the door F is a rod or bar H, over which a lever $a$ has its upper hooked or notched end to catch, and thus hold the said door F against being pushed down. The other door G is held firmly in this position by means of projections $t$, extending from the under side of the inner edge of the door F and catching under the said door G.

Pivoted to the cage at the latch edge of the cage door or gate is a lever I, which has one end connected by means of a chain or rod J to the upper end of the catch or lever $a$. Pivoted upon the cage above the lever I is a second lever K, which has its outer end formed into a catch, as shown, to engage the outer end of a projecting slat or pin L. The inner end of this catch is connected with the bar H of the spring-door F by means of a chain or rod M.

Pivoted to the inner lower edge of the cage to swing vertically are the two plates or boards V, which are connected by means of a rod N to a lever P, that is pivoted on the top of the said cage. The object of these boards is to hold the sheep under the water or solution the required depth, so that he is thoroughly wet thereby. Extending across the tank beyond the said pivoted boards V is a board $k$, which is provided at its under side with teeth $l$, as shown, and the object of this board is to hold the sheep in the solution and prevent him from getting out until it is desired. When it is released, it travels up the inclined end of the tank and into the draining-rack P', where it is kept until properly drained of the surplus solution, which is caught by the said rack, owing to the bottom thereof being solid and provided with a vertical edge of about four inches.

In order to prevent the trap-door F from coming up ahead of the door G, and thus not have the last-named door caught upon the projections at the inner edge of the door F, there is pivoted in the top of the cage between its ends a lever R, which has its opposite ends connected, respectively, with the said doors and in such a manner that the door F cannot come up before the door G, as will be readily understood, thus always insuring that the doors are in their proper relation to each other for operation.

The other end of the draining-rack is provided with a gate S, that is provided with spring-hinges that keep it normally open, and this gate is connected by means of a cord or rod T with a lever $d$ upon the top of the cage. By means of this construction the operator by means of the said lever can allow the gate to open and a sheep to pass out and then close the same when he so desires.

The operation of my invention is as follows: The animal to be dipped is driven into the cage upon the trap-doors with his head between the boards at the inner end thereof. If the tank is placed upon the top of the ground, as here shown, an inclined plane will be constructed to drive the animal into the cage; but, if desired, the tank can be sunk into the ground, so that the bottom of the cage will be substantially even with the surface of the ground. The animal being inside of the cage and upon the trap-doors, which are prevented from descending under its weight by the catch over the bar H of the door F, the closing of the gate E causes the pin or projection thereof to engage the lever I at its upper end, thus forcing its lower end outward and drawing the catch or lever $a$ from over the bar H, which unlocks the trap-doors and allows them to drop and the animal to pass through into the water or solution within the tank. The falling of the door F allows the catch K to engage the pin L of the gate E and hold it closed until the door is again raised, which moves the outer end of the latch up and allows the gate to open. By means of the board $k$ the animal is held in the solution the desired or required time, and when the gate is opened the said board $k$ is raised through the medium of the connection between the said board and gate, as will be understood. The animal then passes up the inclined end B of the tank into the draining-rack. While in the tank the animal is held the desired depth in the solution of water by means of the boards V, which will be weighted for that purpose, if necessary.

By means of an apparatus of the above-described construction it will be seen that animals can be rapidly dipped and with but little expense and trouble.

Having thus described my invention, what I claim, and desire to secure by Letters Patent, is—

1. In an apparatus of the character described, a tank, a cage over the tank, trap-doors at the bottom of the cage, a lock for the said doors, a gate at one end of the cage, and a lock-tripping mechanism operated by the gate for unlocking the said trap-doors when the gate is closed, substantially as specified.

2. In an apparatus of the character described, a tank, a cage over the tank, trap-doors at the bottom of the cage, a retaining-board projecting into the tank inside of the cage, a gate for the cage, and a connection between the said gate and retaining-board, whereby when the gate is opened the board is raised, substantially as described.

3. In an apparatus of the character described, comprising a tank, a cage over the tank, trap-doors forming the bottom of the cage, a latch for locking the doors in a horizontal position, a gate for the cage, and a lever connected with the said latch and in the path traveled by the gate to be engaged thereby for disengaging the latch from the trap-doors when the gate is closed, substantially as described.

4. In an apparatus of the character described, comprising a tank, a cage over the tank at one end, trap-doors forming the bottom of the tank, and boards hinged at the inner end of the cage for holding the animal down, substantially as described.

In testimony whereof I affix my signature in presence of two witnesses.

ELMER A. FIRESTONE.

Witnesses:
WILLIAM BRIDGBRIM,
S. D. OAKLEY.